US008010235B2

(12) United States Patent
Freeman

(10) Patent No.: US 8,010,235 B2
(45) Date of Patent: Aug. 30, 2011

(54) APPROACHING AND COMPENSATING FOR MACHINE KINEMATIC SINGULARITIES

(75) Inventor: Philip L. Freeman, Maryland Heights, MO (US)

(73) Assignee: The Boeing Company, Chicago, IL (US)

( * ) Notice: Subject to any disclaimer, the term of this patent is extended or adjusted under 35 U.S.C. 154(b) by 1090 days.

(21) Appl. No.: 11/514,072

(22) Filed: Aug. 31, 2006

(65) Prior Publication Data

US 2007/0112468 A1 May 17, 2007

Related U.S. Application Data

(63) Continuation-in-part of application No. 11/142,829, filed on May 31, 2005, now Pat. No. 7,571,027.

(51) Int. Cl.
*G05B 21/00* (2006.01)

(52) U.S. Cl. ........................................ 700/265

(58) Field of Classification Search .................. 700/265, 700/245; 703/2
See application file for complete search history.

(56) References Cited

U.S. PATENT DOCUMENTS

| 4,680,519 | A | * | 7/1987 | Chand et al. | 318/568.19 |
|---|---|---|---|---|---|
| 4,937,759 | A | * | 6/1990 | Vold | 700/262 |
| 4,967,126 | A | * | 10/1990 | Gretz et al. | 318/568.19 |
| 5,038,089 | A | * | 8/1991 | Szakaly | 701/23 |
| 5,590,034 | A | | 12/1996 | Snell | |
| 5,793,795 | A | * | 8/1998 | Li | 375/133 |
| 6,208,949 | B1 | * | 3/2001 | Eatwell | 702/189 |
| 6,603,281 | B2 | * | 8/2003 | Yim et al. | 318/560 |
| 6,845,295 | B2 | | 1/2005 | Cheng et al. | |
| 2003/0158715 | A1 | * | 8/2003 | Ottusch et al. | 703/2 |
| 2005/0027397 | A1 | * | 2/2005 | Niemeyer | 700/245 |
| 2005/0055175 | A1 | * | 3/2005 | Jahns et al. | 702/182 |
| 2006/0259283 | A1 | * | 11/2006 | Brughmans et al. | 703/2 |
| 2007/0013336 | A1 | * | 1/2007 | Nowlin et al. | 318/568.21 |
| 2008/0058984 | A1 | * | 3/2008 | Gray et al. | 700/192 |

FOREIGN PATENT DOCUMENTS

WO    WO 2006/130664    12/2006

OTHER PUBLICATIONS

Oetomo D. et al: "Singularity Robust Manipulator Control Using Virtual Joints"; proceedings of the 2002 IEEE International Conference on Robotics and Automation; ICRA (2002); Washington, DC, May 11-15, 2002; New York, NY: IEEE, US, vol. 3, May 11, 2002, pp. 2418-2423.

(Continued)

*Primary Examiner* — John Q Nguyen
*Assistant Examiner* — Rodney King
(74) *Attorney, Agent, or Firm* — Harness, Dickey & Pierce, P.L.C.

(57) ABSTRACT

A method of operating a multi-axis machine. The machine linkage is monitored to detect an approach by linkage joint(s) toward singularity. A degree of the approached singularity is determined. The joint(s) approaching singularity are identified. Virtual joints are used to replace the identified joint(s) in a manipulator matrix to modify the manipulator matrix. The modified matrix is used to determine position changes for the linkage links. This method can provide software-based compensation for a wide range of machine configurations, without a priori knowledge of singularities for a given machine.

16 Claims, 3 Drawing Sheets

OTHER PUBLICATIONS

Chiaverini S.: "Singularity-Robust Task-Priority Redundancy Resolution for Real-Time Kinematic Control of Robot Manipulators"; IEEE Transactions on Robotics and Automation, IEEE Inc., New York, US, vol. 13, No. 3, Jun. 1, 1997, pp. 398-410.

Kirenski M. V. Ed—Institute of Electrical and Electronics Engineers: "Symbolical Singular Valve Decomposition for a 7-DOF Manipulator and Its Application to Robot Control"; proceedings of the International Conference on Robotics and Automation, Atlanta, May 2-6, 1993; Los Alamitos, IEEE Comp. Soc. Press, US, vol. Conf. 10, May 2, 1993, pp. 895-900.

Publication by Hanqi Zhuang and Zvi. S. Roth, Camera-Aided Robot Calibration, 1996, p. 282-285.

\* cited by examiner

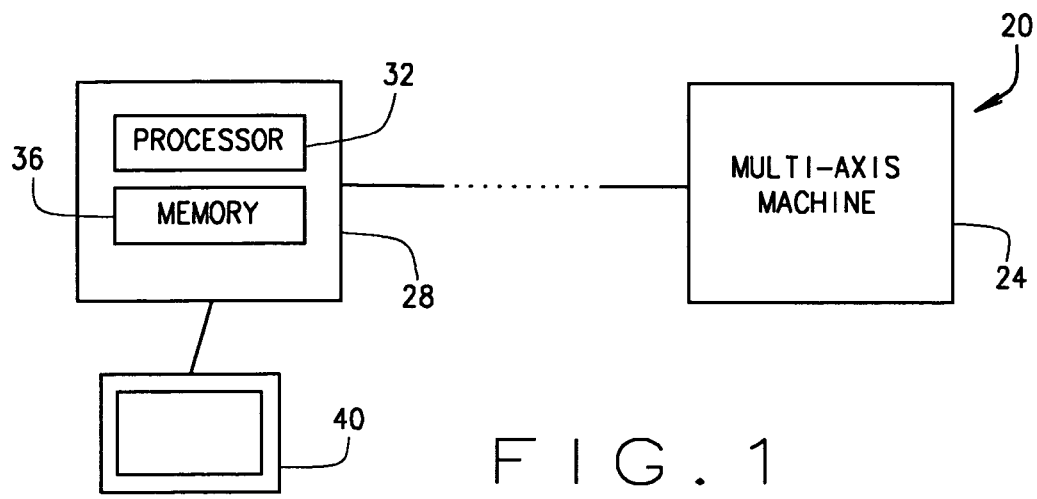
F I G . 1
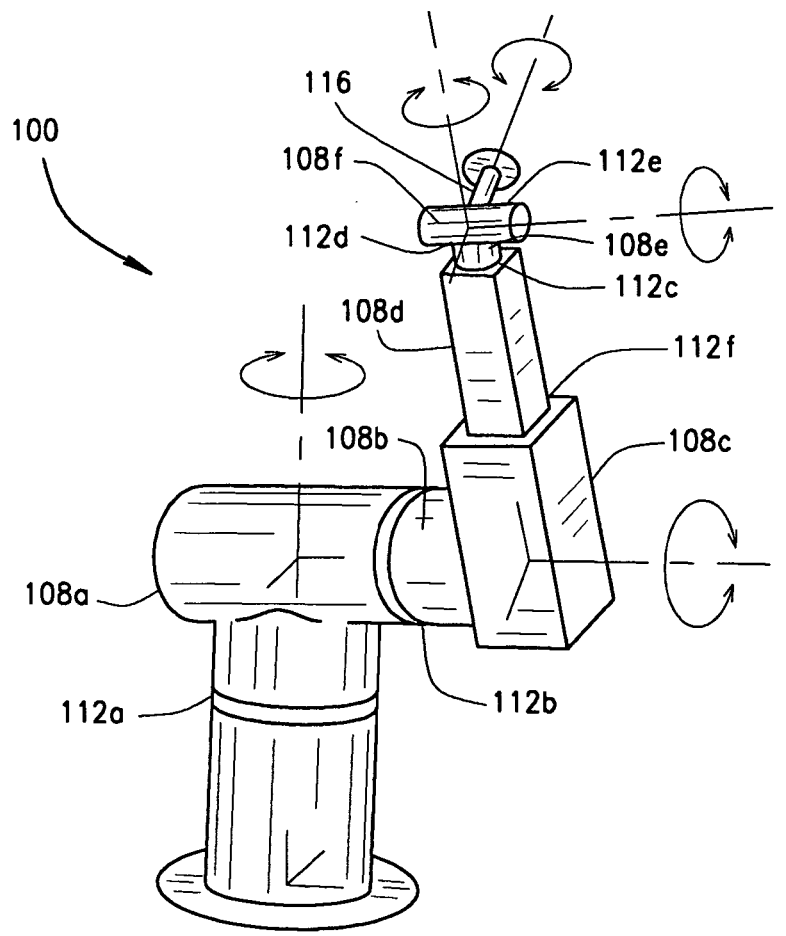
F I G . 2

US 8,010,235 B2

APPROACHING AND COMPENSATING FOR MACHINE KINEMATIC SINGULARITIES

CROSS-REFERENCE TO RELATED APPLICATIONS

This application is a continuation-in-part of co-pending U.S. patent application Ser. No. 11/142,829 filed on May 31, 2005. The disclosure of the above application is incorporated herein by reference.

STATEMENT REGARDING FEDERALLY SPONSORED RESEARCH OR DEVELOPMENT

This invention was made with Government support under contract number F33615-99-2-5215 awarded by the United States Air Force. The Government has certain rights in this invention.

FIELD

The present disclosure relates to multi-axis machines and, more particularly, to systems and methods of dealing with kinematic singularities during machine operation.

BACKGROUND

The statements in this section merely provide background information related to the present disclosure and may not constitute prior art.

Many machine tool installations are operated under numerical control (NC) to produce high-precision items such as aircraft parts. In such installations, a multi-axis machine may be software-driven to move one or more machine tools relative to a work piece. A multi-axis kinematic linkage of the machine is capable of moving a tool relative to a plurality of predetermined coordinate axes. Specifically, a plurality of translational and/or rotational joints may be operable singly and/or cooperatively to move one or more links to position a tool at a desired location. Occasionally, however, a multi-axis linkage may be moved to a position ("singularity", or "singular point") in which one or more degrees of freedom are lost. At a singular point, one or more joints may be incapable of moving a tool as instructed by the software.

SUMMARY

The present disclosure, in one implementation, is directed to a method of operating a multi-axis machine. A kinematic linkage of the machine is monitored to detect an approach by one or more joints of the linkage toward singularity. The monitoring is performed using a manipulator matrix. A degree n of the approached singularity is determined. The one or more joints approaching singularity are identified. The method includes obtaining n virtual joints, replacing the one or more identified joints with the virtual joints in the manipulator matrix to modify the manipulator matrix, and using the modified manipulator matrix to determine position changes for links of the linkage.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 1 is a diagram of a numerically controlled (NC) processing system in accordance with one implementation of the present disclosure;

FIG. 2 is a frontal perspective view of a portion of a multi-axis kinematic linkage of a machine controlled in accordance with one implementation of the present disclosure;

DETAILED DESCRIPTION OF THE PREFERRED EMBODIMENTS

Figures 3, 4A:
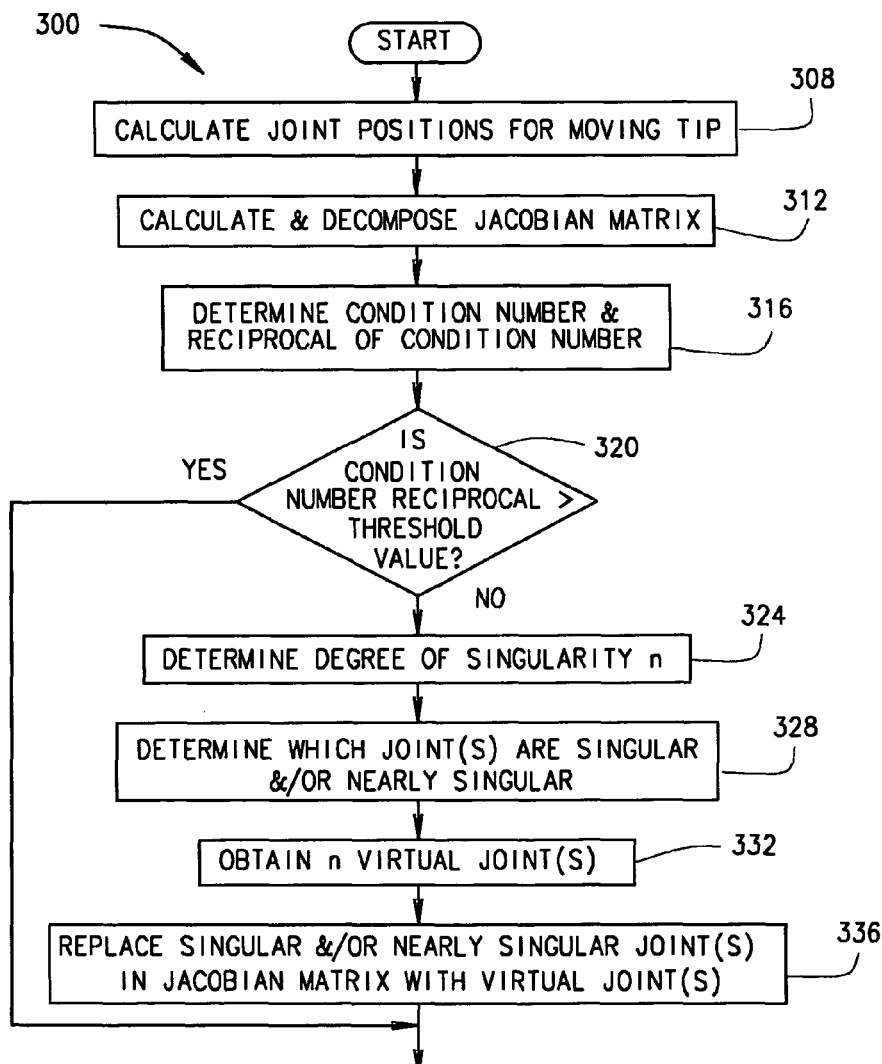
FIG. 3 is a diagram of a singular value decomposition of a manipulator Jacobian matrix in accordance with one implementation of the disclosure.
FIGS. 4A and 4B are a flow diagram of a method of operating a multi-axis machine in accordance with one implementation of the disclosure.

The following description is merely exemplary in nature and is not intended to limit the present disclosure, application, or uses. It should be understood that throughout the drawings, corresponding reference numerals indicate like or corresponding parts and features.

In co-pending U.S. patent application Ser. No. 11/142,829, entitled "Kinematic Singular Point Compensation Systems and Methods", the disclosure of which is incorporated herein by reference, various systems and methods are described for positioning a tip portion of a multi-axis kinematic linkage near a singularity. The present disclosure, in one implementation, is directed to a method of automatically determining in real time (1) whether a machine linkage is approaching a singularity and how close the linkage is to the singularity, (2) which joint(s) of the linkage are approaching the singularity, and (3) which degrees of freedom would be lost at the singularity.

A numerically controlled (NC) processing system in accordance with one implementation of the present disclosure is indicated generally in FIG. 1 by reference number 20. The system 20 includes one or more multi-axis machines 24, one of which is shown in FIG. 1. A machine 24 may be configured, for example, to perform multi-axis machining operations on a work piece (not shown). Additionally or alternatively, the system 20 may include other types of multi-axis machines capable of component placement, for example, a numerically controlled assembly robot.

The system 20 includes one or more computers 28, one of which is shown in FIG. 1. The computer 28 includes a processor 32 and memory 36. The computer 28 may be programmed in accordance with one implementation of the disclosure to monitor and control operation of the multi-axis machine 24. The computer 28 may be used to execute software for adjustably compensating the positioning of the multi-axis machine 24, as further described below. Software compensation may be used, e.g., to adjust for certain "as-built" conditions of the machine 24 in order to bring operation of the machine 24 within tolerances specified relative to an ideal or "perfect" machine.

A user interface 40 is provided by which a user may communicate with the system 20. It should be noted that the present disclosure could be implemented relative to many and various kinds of installations, including but not limited to materials processing installation configurations described in co-pending U.S. patent application Ser. No. 11/142,829. It shall be understood by those skilled in the art that many different types and configurations of multi-axis machines, computers, processors, input-output devices, communication systems, etc., could be included in NC processing systems in accordance with various implementations of the disclosure.

A portion of a multi-axis kinematic linkage of the machine 24 is indicated generally in FIG. 2 by reference number 100. The linkage 100 includes six movable links 108a-108f interconnected by six joints 112a-112f. Joints 112a-112e are rotary and joint 112f is prismatic. The linkage 100 is operable by the computer 28 to position and control a tip portion 116 along a predefined path during a work process. The tip portion 116 may have, e.g., a cutting tool or other type of tool (not shown) mounted thereon. It should be understood that the linkage 100 is exemplary only. Machines 24 may have linkages more or less complex than the linkage 100 and may include more, fewer and/or different types of links and/or joints and/or may provide more, fewer and/or different degrees of freedom and/or types of degrees of freedom.

In operation, the linkage 100 is driven by the computer 28 via a drive apparatus (not shown), e.g., one or more electric motors. As a link 108 is driven, the positioning of other links 108 may be affected. Position and orientation of the tip portion 116 may be represented by a vector X, which is related to a link position vector Q by a set of functions f( ) such that X=f(Q). A Jacobian of the function set f( ), defined as $J(Q)=(\partial x_i/\partial q_j)$, maps differential motions of the joints 112 to their respective effects on the position and orientation of the tip portion 116. Where the foregoing relationship is approximated by linearization, $J\Delta Q=\Delta X$ so that a change in the Cartesian position X of the tip portion 116 is related to a change in the link positions Q. As the linkage 100 approaches a singularity, the Jacobian matrix J(Q) becomes progressively more ill-conditioned. When the singularity is reached, the Jacobian matrix J(Q) becomes rank-deficient.

In one implementation of a method of operating the linkage 100 in accordance with the disclosure, singular value decomposition (SVD) is used to determine (1) whether the linkage 100 is approaching a singularity and how close the linkage 100 is to the singularity, (2) which joint(s) 112 of the linkage are approaching the singularity, and (3) which degrees of freedom would be lost at the singularity. Generally, singular value decomposition (SVD) can be used to decompose any matrix A into a set of three matrices U, S, and V such that $U*S*V^T=A$, where U and V are ortho-normal and S is diagonal with elements arranged along the diagonal in descending order. Given a matrix A, known algorithms may be used for computing U, S, and V in an essentially efficient and stable manner. The diagonal elements of S may be referred to as singular values of A. The columns of U may be referred to as left singular vectors. The columns of V (i.e., the rows of $V^T$) may be referred to as right singular vectors.

A diagram of singular value decomposition of a manipulator Jacobian matrix J in accordance with one implementation of the disclosure is indicated generally in FIG. 3 by reference number 200. Referring to FIGS. 2 and 3, differential motions of the joints 112 are related to their respective effects on positioning of the tip portion 116 by the manipulator matrix J. Each column 204 of J is associated with a corresponding joint 112. Singular value decomposition of the matrix J into matrices U, S and V results in left singular vectors 208 in the matrix U which represent the orthogonal degrees of freedom of the linkage 100, in order of most sensitive 216 to least sensitive 224. In the matrix V (the transpose of matrix $V^T$), right singular vectors 228 are obtained which represent the combinations of joint motion that move the linkage 100 in the directions described by U. In the matrix S, singular values 236 of J are obtained which represent a degree of "manipulability" of the linkage 100. Accordingly, the joint 112 that is represented as dominant in the last column 242 of V (i.e., the last row of matrix $V^T$) is the most singular joint 112 of the linkage 100, and the direction represented in the last column 224 of U is a potentially lost degree of freedom in the linkage 100.

Additionally, a condition number of the manipulator matrix J may be calculated by dividing a largest singular value 236 by a smallest singular value 236. The condition number may range from 1 for a perfectly conditioned matrix to infinity for a singular matrix. In some implementations, for numerical stability, a reciprocal of the condition number is used, which ranges from 1 for a perfectly conditioned matrix to 0 for a singular matrix.

Figure 4B:
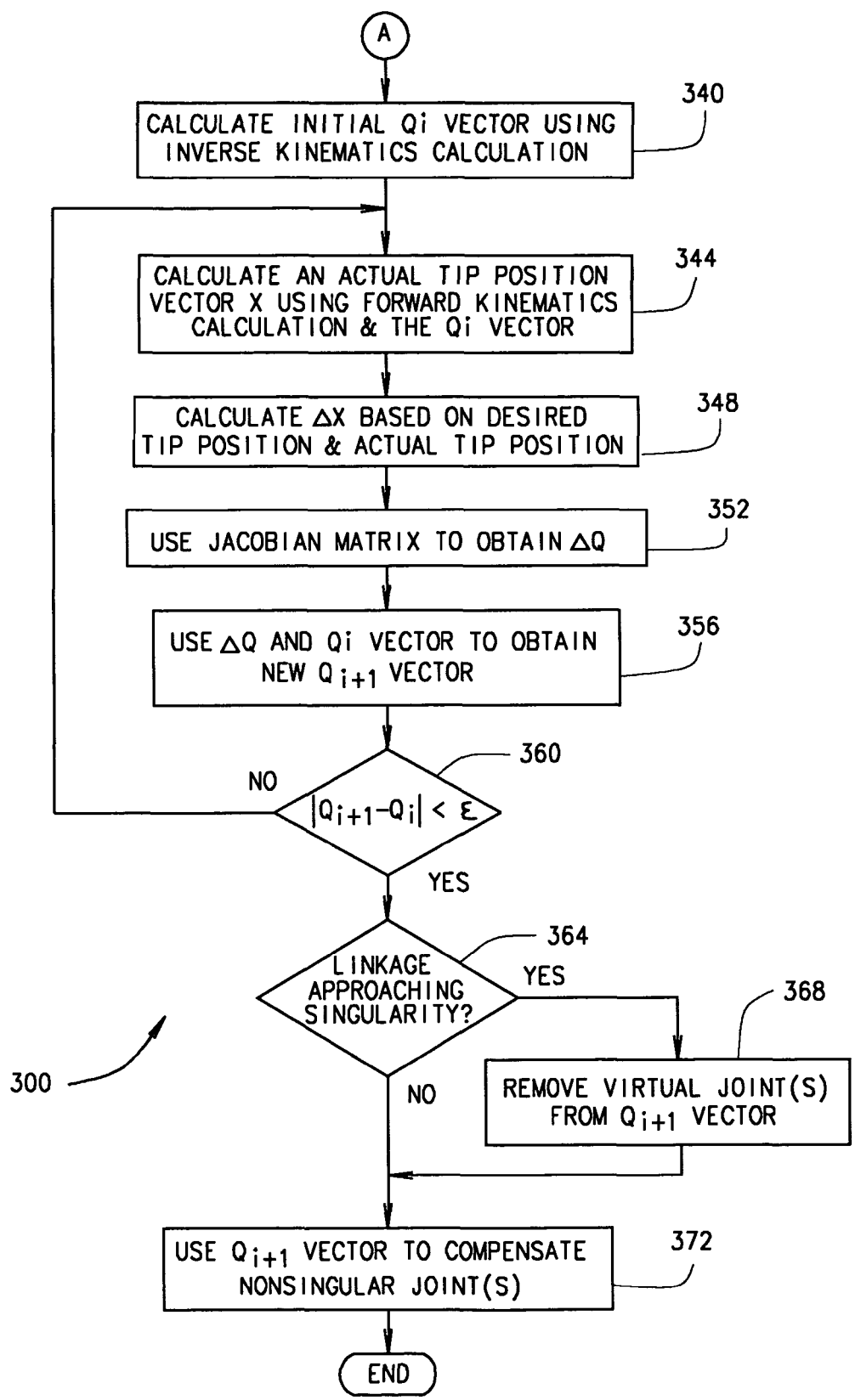

A flow diagram of a method of operating the machine 24 in accordance with one implementation of the disclosure is indicated generally in FIGS. 4A and 4B by reference number 300. In operation 308, kinematic joint positions for moving the tip portion 116 along a prescribed path are calculated. In operation 312, a manipulator Jacobian J corresponding to the calculated joint 112 positions is calculated and then decomposed using SVD. In operation 316, a reciprocal of a condition number is determined. In operation 320, the condition number reciprocal is compared to a predefined threshold value, e.g., 0.001. If the condition number reciprocal is greater than the threshold value, then it is assumed that the linkage 100 is not approaching any singularities, and control passes to operation 340.

If the condition number reciprocal is less than or equal to the threshold value, then it is assumed that one or more joints 112 of the linkage 100 are approaching singularity. Accordingly, in operation 324, a degree n of the singularity is determined in the following manner. The smallest singular value 236 that raises the condition number reciprocal above the threshold value is determined. For example, if the singular values 236 are {0.7, 0.4, 0.2, 0.1, 0.0006, 0.0001}, then the smallest singular value that raises the condition number reciprocal above the threshold value 0.001 is 0.2 (0.2/0.5=0.285, but 0.0006/0.7=0.00086) and the degree n of the singularity is 2 (that is, two singular directions are indicated).

In operation 328, it is determined which joint(s) 112 are singular and/or nearly singular, by locating the largest element of the last n right singular vector(s) 228. In operation 332, n "virtual joint(s)" are obtained by taking the last n left singular vector(s) 208 and multiplying them by the largest singular value 236. In operation 336, the column(s) 204 of J associated with the joint(s) 112 determined in operation 328 are replaced with the "virtual joint(s)" obtained in operation 332.

In operations 340 through 360, compensation for the linkage 100 is calculated, e.g., by iterative solution of the system J*dq=dx to convergence, as described in co-pending U.S. patent application Ser. No. 11/142,829. Specifically and for example, in operation 340, a nominal inverse kinematics calculation is used to obtain an initial link position vector $Q_i$. In operation 344, an as-built forward kinematics calculation and the link position vector $Q_i$ are used to obtain an actual tip position vector X. In operation 348, a $\Delta X$ vector is calculated, indicating a difference between a desired tip position vector and an actual tip position vector. In operation 352, a $\Delta Q$ vector is calculated using the Jacobian matrix obtained in operation 312 (and as the Jacobian matrix may have been modified in operation 336). In operation 356, the $\Delta Q$ vector calculated in operation 352 and the link position vector $Q_i$ are used to obtain a new link position vector $Q_{i+1}$. In operation 360, convergence is tested by comparing an absolute difference between vectors $Q_{i+1}$ and $Q_i$ to a predetermined convergence criterion $\epsilon$. If convergence has not yet been reached, the vector $Q_{i+1}$ is used to update the vector $Q_i$ and control returns to operation 344. When convergence is reached in operation 360, it then is determined in operation 364 whether the condition number reciprocal was less than the threshold value, that is, whether the linkage is approaching singularity. If yes, then in operation 368, value(s) representing the "virtual joint (s)" are removed from the vector $Q_{i+1}$ which then is used in operation 372 to compensate the non-singular joints 112.

Because SVD is performed only once for each point and is not part of the iterative solution process, the foregoing methods and systems are less computationally expensive than linear quadratic regulation (LQR) or damped least squares.

The foregoing methods and systems have numerous advantages. For example, left singular vectors provide ideal "virtual joint(s)", in that they move the linkage in exactly the singular direction(s), regardless of the position or complexity of the machine. Another advantage is that by scaling the "virtual joint(s)" by the largest singular value, the resulting condition of the new manipulator Jacobian is optimized, thereby assuring a stable, rapidly converging solution, e.g., in operations 340 through 360 of the foregoing method 300. Additionally, implementations of the foregoing method require no a priori knowledge of the locations of singularities for the machine, so the same algorithm can be used on a variety of machines without change.

Implementations of the present disclosure provide a means of improving the positioning accuracy of automation equipment that works near its singularity. Where accuracy can be improved, costs of acquisition of new capital equipment, and maintenance costs for existing equipment, can be lowered. Furthermore, various implementations of the present disclosure can provide a single method that works on several different machine geometries, thereby reducing a need for software development and maintenance to deal with new machine geometries.

Calibrated machine tools can be provided which are capable of producing more accurate work. Thus higher precision parts can be made with less waste material. When implemented in connection with aircraft production, the production of higher-precision parts can result in reduced weight and improved performance of aircraft. Implementations of the disclosure can result in reduced set-up time and more productive use of machine tools, thereby reducing the cost of machining.

Various implementations of the foregoing methods and systems make it possible to use software to compensate machines that have complex singularity configurations (e.g., a six-axis revolute robot). Compensation can be provided "on the fly" for a wide range of machine configurations, even without precise a priori knowledge of the location or nature of all singularities for a given machine. The same core compensation software can be used on a wide range of machine configurations without a need to rewrite the software based on machine geometry.

What is claimed is:

1. A method of operating a multi-axis machine, the method comprising:
monitoring a kinematic linkage of the machine by a singular value decomposition to discover a singularity by detecting an approach by one or more joints of the linkage toward the singularity, detecting which specific joint or joints of the one or more joints are approaching singularity, and predicting which degree or degrees of freedom would be lost at the singularity, the monitoring performed using a manipulator matrix;
determining a degree n of the approached singularity by determining a smallest singular value that raises a condition number of the manipulator matrix above a predetermined threshold;
identifying the one or more joints approaching singularity;
obtaining n virtual joints;
replacing the one or more identified joints with the virtual joints in the manipulator matrix to modify the manipulator matrix;
using the modified manipulator matrix to determine position changes for links of the linkage; and
wherein identifying the one or more joints approaching singularity comprises detecting a largest element of each of n right singular vectors of the decomposition.

2. The method of claim 1, wherein the monitoring is performed using singular value decomposition of the manipulator matrix.

3. The method of claim 1, wherein the manipulator matrix includes a Jacobian matrix.

4. The method of claim 1, further comprising:
removing one or more values representing the n virtual joints from the position changes to modify the position changes; and
using the modified position changes to compensate for one or more non-singular joints of the linkage.

5. The method of claim 1, wherein obtaining n virtual joints comprises multiplying n left singular vectors of a decomposition of the manipulator matrix by a largest singular value of the decomposition.

6. A method of operating a multi-axis machine, the method comprising:
monitoring a kinematic linkage of the machine by a singular value decomposition to discover a singularity by detecting an approach by one or more joints of the linkage toward the singularity, detecting which specific joint or joints of the one or more joints are approaching singularity, and predicting which degree or degrees of freedom would be lost at the singularity, the monitoring performed using a manipulator Jacobian matrix, the singular value decomposition including operations of;
decomposing the manipulator Jacobian matrix to obtain degrees of freedom of a linkage of the machine, singular values of the manipulator Jacobian matrix, and combinations of joint motions for moving joints of the machine in accordance with the degrees of freedom;
using the singular values to discover a singularity and to determine whether the linkage is approaching the singularity; and
based on whether the linkage is approaching the singularity:
using the singular values to determine a degree of singularity n by determining a smallest singular value that raises a condition number of the manipulator Jacobian matrix above a predetermined threshold;
using the combinations of joint motions, determining which joints are approaching singularity;
using the orthogonal degrees of freedom to obtain n virtual joints; and
using the virtual joints in the manipulator Jacobian matrix to obtain position changes for links of the linkage; and
wherein identifying the one or more joints approaching singularity comprises detecting a largest element of each of n right singular vectors of the decomposition.

7. The method of claim 6, wherein the condition number is obtained by using the singular values to determine whether the linkage is approaching the singularity, and by using a largest of the singular values and a smallest of the singular values to obtain the condition number of the manipulator Jacobian matrix.

8. The method of claim 6, wherein determining which joints are approaching singularity comprises detecting a largest element of each of n right singular vectors obtained in the decomposing.

9. The method of claim 6, further comprising removing one or more values representing the n virtual joints from the position changes to modify the position changes; and
using the modified position changes to compensate for one or more non-singular joints of the linkage.

10. A numerically controlled (NC) processing system comprising:
a multi-axis machine including a kinematic linkage having a plurality of links and a plurality of joints connecting the links; and
a processor configured to monitor the kinematic linkage using a singular value decomposition to discover a singularity by detecting an approach by one or more joints of the linkage toward the singularity, detecting which specific joint or joints of the one or more joints are approaching singularity, and predicting which degree or degrees of freedom would be lost at the singularity, the monitoring performed using a manipulator Jacobian matrix, the processor adapted to:
monitor the linkage to discover a singularity by detecting an approach by one or more joints of the linkage toward the singularity, the monitoring performed using a manipulator Jacobian matrix;
determine a degree n of the approached singularity by determining a smallest singular value that raises a condition number of the manipulator Jacobian matrix above a predetermined threshold;
identify the one or more joints approaching singularity;
obtain n virtual joints;
replace the one or more identified joints with the virtual joints in the manipulator Jacobian matrix to modify the manipulator Jacobian matrix;
use the modified manipulator Jacobian matrix to determine position changes for links of the linkage; and
wherein identifying the one or more joints approaching singularity comprises detecting a largest element of each of n right singular vectors of the singular value decomposition.

11. The system of claim 10, wherein the processor is further configured to decompose the manipulator Jacobian matrix to perform the monitoring.

12. The system of claim 10, wherein the processor is further configured to use a largest singular value of the singular value decomposition of the manipulator Jacobian matrix to scale the n virtual joints.

13. The system of claim 10, wherein the processor is further configured to remove one or more values representing the n virtual joints from the position changes to modify the position changes; and
use the modified position changes to compensate for one or more non-singular joints of the linkage.

14. The system of claim 10, wherein the condition number is obtained by configuring the processor to decompose the manipulator Jacobian matrix.

15. The system of claim 10, wherein the machine includes a tip controlled via the linkage, and the processor is further configured to determine a compensation value for a link of the linkage in accordance with $J*dq=dx$ where J represents the modified manipulator Jacobian matrix, dq represents change in link position, and dx represents change in position of the tip.

16. The system of claim 10, wherein the processor is further configured to use one or more representations of orthogonal degrees of freedom to obtain the n virtual joints.

* * * * *